July 22, 1947.   L. H. MORIN   2,424,488
ADHESIVE TAPE DISPENSER
Filed Sept. 26, 1945   2 Sheets-Sheet 1
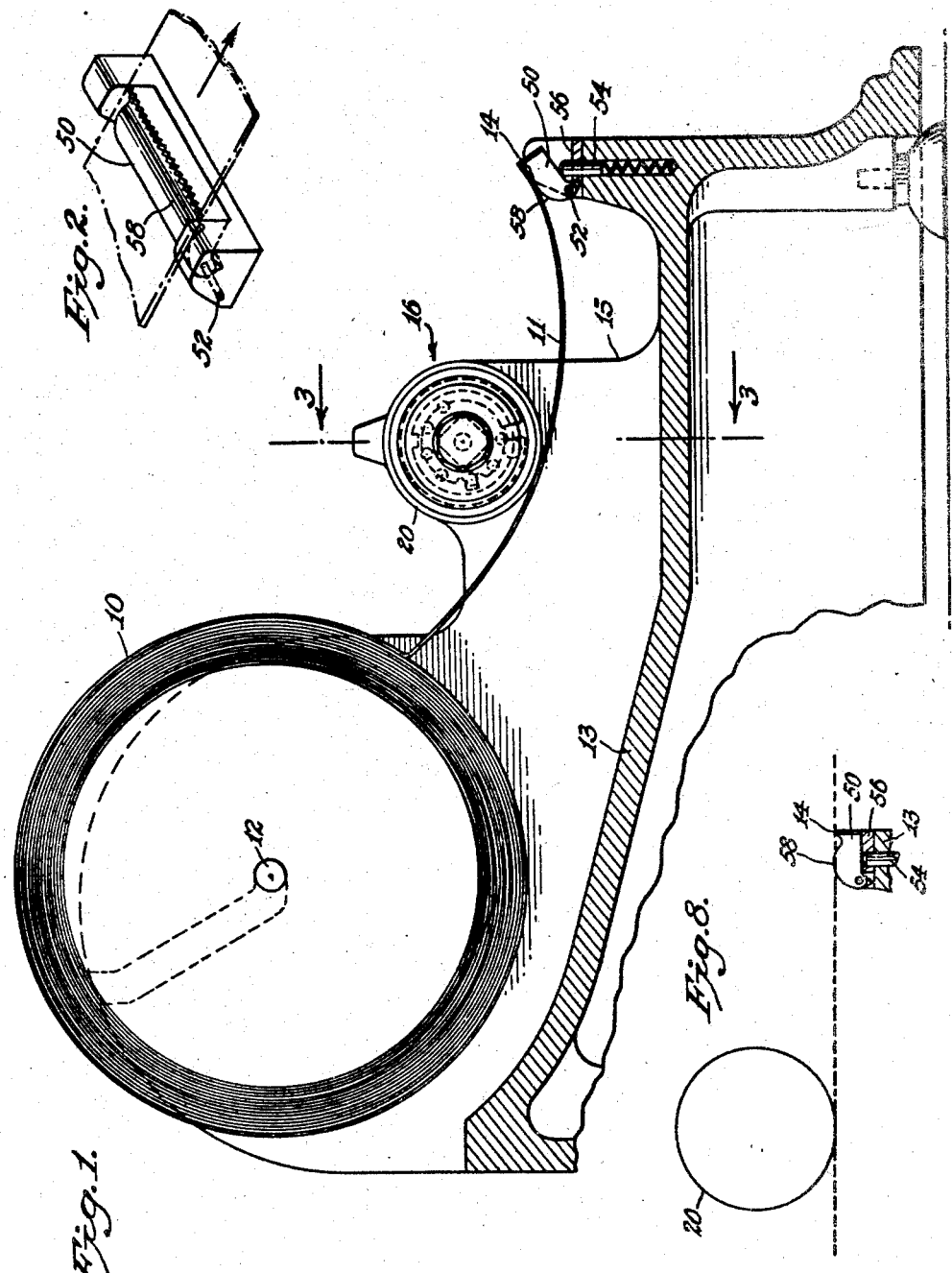
INVENTOR
*Louis H. Morin*
BY *J. L. Chisholm*
ATTORNEY

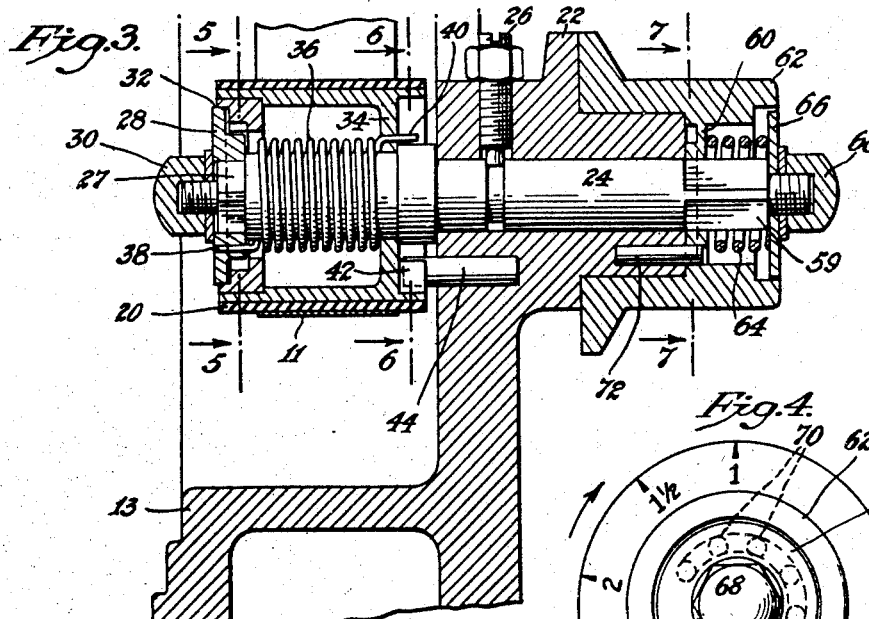

Patented July 22, 1947

2,424,488

UNITED STATES PATENT OFFICE 2,424,488

ADHESIVE TAPE DISPENSER

Louis H. Morin, New York, N. Y., assignor to Industrial Tape Corporation, a corporation of New Jersey Application September 26, 1945, Serial No. 618,694

15 Claims. (Cl. 164—84.5)

1

This invention relates to tape dispensers designed to make available or dispense convenient lengths of pressure-sensitive tape, such as is used in stores for wrapping packages.

Many pressure-sensitive adhesive tapes, particularly the cellophane tapes, have such an adhesive character that using them without a dispenser is very inconvenient. Consequently various arrangements have been proposed for holding a roll of tape so that it may be readily unrolled and the desired length severed.

My invention relates to an improved tape dispenser of this general category, which is provided with improved and convenient means for holding the tape, measuring a desired length of tape to be used, and cutting off the tape when measured.

Among the objects of the invention is the provision of improved means for measuring and holding the tape without letting its pressure-sensitive face come in contact with objects which can contaminate it or make dispensing difficult, and improved means for releasing the tension of the tape after a length has been measured whether or not the end is severed from the tape, to facilitate the return of the measuring device to its original position in order to measure the next length of tape.

In the drawings,

Fig. 1 is a vertical longitudinal section of one form of tape dispenser embodying the invention;

Fig. 2 is a perspective view of a tape severing device embodied in Fig. 1;

Fig. 3 is a vertical cross-section of the measuring mechanism on the line 3—3 of Fig. 1;

Fig. 4 is an elevation from the right of Fig. 3 of the dial for setting the measuring mechanism;

Fig. 5 is a section of the measuring mechanism on the line 5—5 of Fig. 3;

Fig. 6 is a section of the measuring mechanism on the line 6—6 of Fig. 3;

Fig. 7 is a section of the setting mechanism for the measuring mechanism on the line 7—7 of Fig. 3, and Fig. 8 is a diagram indicating the position of essential parts of the apparatus at the moment of severing the tape.

Referring to the drawings, a roll 10 of pressure-sensitive adhesive tape 11 is mounted for rotation on a spindle 12 supported in any suitable base or support 13. The roll 10 is so placed that when the tape is pulled from the roll 10 as seen in Fig. 1, the top or back being non-adhesive. Tape pulled from

2 the roll always leaves the roll substantially along a radial line, as shown in Fig. 1, the adhesion of the tape to the roll requiring an appreciable tension in the tape to remove it. The tape is severed by being pressed across a serrated severing edge 14. The unsevered end of the tape having had its pressure-sensitive side pressed against the severing edge, adheres to this edge to hold the tape in position for the user readily to grasp the next length to be used. To assist this grasping the base 13 is customarily made with a notch 15 behind and adjacent the severing edge, into which a finger may be inserted.

Between the roll 10 and severing edge 14 is a measuring device generally denoted by the reference 16 which permits a desired length of tape to be unrolled from the roll 10 and thereafter either stops the unrolling or indicates that the desired length has been unrolled by markedly increasing the resistance to unrolling.

This measuring mechanism is shown best in Figs. 3 to 7. A roller or drum 20 is engaged by the back or non-adhesive side of the tape 11 as the tape is pulled under tension away from the roll 10 and toward the severing edge 14, so that the drum is rotated counter-clockwise as seen in Fig. 1. The position of the metering drum 20 is chosen to place the lowermost portion of its periphery below the line joining the cutting edge 14 (in its lowermost position) and the point where the tape leaves the supply roll, which is below the line joining the cutting edge and the center of the supply roll. This insures contact between the metering roll and the tape, and the metering roll is placed low enough to insure a sufficient arc of contact to provide the desired frictional resistance between the non-tacky back of the tape. Means is provided for stopping the drum when a desired length of tape has been pulled over it.

As shown best in Fig. 3, the base 13 is provided with a boss 22 bored to receive a round shaft 24 which may be held in place laterally, but rotatably in the boss by a set screw 26 entering a groove in the shaft so that the shaft is freely rotatable in the boss. The shaft is normally held against rotation as will be explained. The left end of the shaft, as seen in Fig. 3, is squared at 27 to receive a flange 28 having a square aperture and held on the shaft by a nut 30. The exterior surface 32 of the flange serves as a bearing for one end of the drum 20, the other end of which is provided with a flange 34 serving as the other bearing for rotation of the drum about the shaft. The drum is biased to a single position on the shaft by a torsion spring 36 one end 38 of which is anchored in the flange 28 mounted on the squared end of the shaft and the other end 40 of which is anchored in the flange 34 of the drum. This torsion spring normally holds the drum in position with the stop 42 (Fig. 6) of the drum against a pin 44 in the frame of the dispenser.

Referring to Fig. 5, it will be seen that the flange 28 is provided with a stop 46 and that the interior of the drum 20 is provided with a stop 48. Consequently when the drum is rotated counter-clockwise, as seen in Fig. 6, the stop 46 will limit the amount of its rotation, which limits the amount of tape withdrawn.

As so far described, the apparatus operates as follows. When the tape 11 is drawn under tension under the drum 20 it rotates the drum until the stop 48 in Fig. 5 hits the stop 46 locking the drum against further rotation. It then becomes difficult to draw tape under the drum and the operator knows the desired length of tape has been unrolled. Thereafter the tape is pressed down across the cutting edge 14 and the length of tape which has been measured by the rotation of the drum 20 is severed from the main roll. If a greater length of tape is desired, this may be had either by slacking the tape before cutting to let the drum return to its initial position and repeating the process, or by forcibly drawing more tape over the drum in spite of its frictional resistance.

In devices of this character, the cutting edge may adhere to the unsevered end of the tape, and this holds the tape under tension, holding the drum in the position with the stop 48 against the stop 46. However, if the tension of the tape is slightly relaxed the torsion spring 36 immediately returns the drum to its original position with the stop 42 of Fig. 6 against the pin 44, in position to measure another length of tape. One of the features of my invention is the means for releasing the tension. The cutting edge 14 is formed on a member 50 pivoted at 52 and rotated counter-clockwise by a spring-actuated plunger 54. When the tape is pressed against the edge 14 to sever it, the member 50 is rotated against the action of the plunger spring until it hits the stop 56 provided by the support 13. Thereafter further pressure severs the tape and when the tape has been severed the spring rotates the member 50 counter-clockwise. This brings the severing edge 14 nearer to the drum 20 than it was before, and automatically releases the tension of the tape to allow the measuring drum to return to its original position.

The cutting edge forms means for holding the end of the tape after it has been severed. If it should be found that the cutting edge does not hold this tape with sufficient force, a holding surface 58 is provided on the pivoted member 50 behind the cutting edge. The tape is pressed against this surface which has an extended area and thus holds the tape securely. Preferably the surface is raised above the line which is tangent to the drum and passes through the cutting edge 14 when the cutting edge is pressed against the stop 56 (as shown in Fig. 8) so that in the action of pressing the tape against the cutting edge the unsevered end is automatically pressed against the surface 58 and secured by adhesion. Thus in initiating the severing action the tape is pressed against the surface 58 which constitutes means responsive to initiating of the cutting action for holding the tape. After the tape has been severed the spring automatically rotates the member 50 counter-clockwise and thus forms means responsive to severing of the tape for releasing the tension of the tape.

If desired any suitable means can be provided for adjusting the length of tape dispensed by adjusting the permissible rotation of the drum 20. One form of such means is shown in Figs. 3, 4, and 7. The right-hand end of the shaft 24, as seen in Fig. 3, is provided with a squared portion 59 which receives a square hole of a flange 60 integral with a knob 62. The flange is urged resiliently to the left in Fig. 3 by a spring 64 confined by a washer 66 held on the end of the shaft by a nut 68. Obviously the knob can be slid along the shaft to the right against the compression of the spring. The flange 60 of the knob, as shown best in Fig. 7, is provided with a number of holes 70, any one of which can be placed over a pin 72 fixed in the frame of the machine. Thus when the pin 72 is in one of the holes 70 the shaft 24 is locked against rotation by virtue of the squared end fitting within the flange 60. The particular hole 70 which is on the pin 72 determines the position of the stop 46 seen in Fig. 5. When it is desired to rotate the shaft to change the setting the knob 62 is slid to the right, as shown in Fig. 3, until the flange 60 clears the pin 72, when the knob is rotated and any desired hole 70 is allowed to register with the pin. This rotates the shaft and with it the flange 28 and stop 46, seen in Fig. 5, and this determines the angular space between the stop 46 and the initial position of the stop 48 and thus determines the length of tape to be dispensed. If desired the knob 60 may have graduations, as shown in Fig. 4, indicating actual lengths of tape to be dispensed by the various settings of the knob.

The invention provides means for holding a length of tape between the supply roll and the cutting edge with its tacky side out of contact with all parts of the dispenser. This is important, especially in the case of transparent or colored tapes of the Cellophane type. With such tapes contact between the tacky side of the tape and the metering roll or other parts of the machine not only makes dispensing difficult but smudges the tape, destroying its attractive appearance and even changing its color in spots.

The invention also provides a dispenser which can be operated rapidly. The automatic release of tension upon cutting the tape permits the measuring drum to return instantly, so that another length of tape can be withdrawn immediately.

I claim as my invention:

1. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, means for severing the tape, the severing means being adapted to retain the tape after an end has been severed from the tape, and means responsive to severing of an end from the tape for releasing the tension of the remaining tape.

2. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, means for severing the tape, means responsive to initiation of the severing for retaining the tape, and means responsive to completion of the severing operation for releasing the tension of the remaining tape.

3. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, and means for retaining the end of the tape, said retaining means being movable toward the measuring device when the tape is secured to the retaining means to release the tension of the tape.

4. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, and pivoted means for retaining the end of the tape, said retaining means being rotatable toward the measuring device when the tape is secured to the retaining means to release the tension of the tape.

5. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, means for retaining the end of the tape, and means for moving the retaining means toward the measuring device after the tape has been secured to the retaining means to release the tension of the tape.

6. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, means for retaining the end of the tape, said retaining means being adapted to be moved away from the measuring device when the tape is being secured, and resilient restoring means adapted to move the retaining means toward the measuring device when the tape has been secured to the retaining means.

7. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, severing means, means for retaining the end of the tape adjacent the severing means to hold the tape in position to be grasped, the retaining means being movable toward the measuring device to release the tension of the tape.

8. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, means adapted to sever the tape by pressure against the severing means, means for retaining the end of the tape when the tape is pressed against the severing means, the retaining means being movable toward the measuring device to release the tension of the tape.

9. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, severing means adapted to sever the tape when the tape is pressed against the severing means, means adjacent the severing means for retaining the end of the tape when the tape is pressed against the severing means, the severing means and retaining means being movable toward the measuring device to release the tension of the tape.

10. A dispenser comprising in combination means for holding a supply of pressure-sensitive tape to be dispensed by pulling under tension from the supply, a measuring device adapted to contact the tensioned tape and to be moved in one direction by the tape and to be restored to its original position when the tension on the tape is released, means adapted to sever the tape when the tape is pressed against the severing means and to retain the pressure-sensitive side of the tape after being severed, the severing means being movable toward the measuring device to release the tension of the tape.

11. A dispenser comprising in combination means for holding a supply of pressure-sensitive tape to be dispensed by pulling under tension from the supply, a measuring device adapted to contact the tensioned tape and to be moved in one direction by the tape and to be restored to its original position when the tension on the tape is released, severing means adapted to be moved in one direction against a stop and to sever the tape when the tape is pressed against the severing means, the tape being adapted to extend in a straight line from the measuring device to the severing means and a retaining surface secured to the severing means adapted to project above said line when the severing means is against the stop so that the tape upon being severed will be pressed against said surface, the severing means and said surface being movable toward the measuring device when the tape is severed to release the tension on the tape.

12. A dispenser comprising in combination means for holding a supply of tape to be dispensed by pulling under tension from the supply, a measuring device adapted to contact the tensioned tape and to be moved in one direction by movement of the tape and to be restored to its initial position when the tension of the tape is released, severing means adapted to sever the tape and retain the end of the tape when the tape is pressed against the severing means, said severing means being adapted to be moved in one direction by pressure of the tape against it, and means for moving the severing means in the opposite direction and toward the measuring device to release the tension of the tape after the tape has been severed.

13. A dispenser comprising in combination means for holding a supply roll of tape to be dispensed by pulling under tension from the roll, the tape having a tacky face and a non-tacky back, means for holding the face of the end of the tape at a point remote from the roll to support a length of tape free of the roll and having its tacky face out of contact with other objects, and a metering roll in contact with the back of the tape between the tape roll and holding means.

14. A dispenser comprising in combination means for holding a supply roll of tape to be dispensed by pulling under tension from the roll, the tape having a tacky face and a non-tacky back, a severing edge for holding the face of the end of the tape at a point remote from the roll to support a length of tape free of the roll and having its tacky face out of contact with other objects and a metering roll in contact with the back of the tape between the tape roll and holding means, and the periphery of the metering roll being out of alignment with the severing edge and point of departure of the tape from the supply roll to hold the tape under tension in contact with the metering roll.

15. A dispenser comprising in combination means for holding a supply roll of tape to be dispensed by pulling under tension from the roll, the tape having a tacky face and a non-tacky back, a severing edge for holding the face of the end of the tape at a point remote from the roll to support a length of tape free of the roll and having its tacky face out of contact with other objects and a metering roll in contact with the back of the tape between the tape roll and holding means, and the periphery of the metering roll being out of alignment with the severing edge and center of the tape supply roll to hold the tape under tension in contact with the metering roll.

LOUIS H. MORIN.

REFERENCES CITED

The following references are of record in the file of this patent:

UNITED STATES PATENTS

| Number | Name | Date |
|---|---|---|
| 2,362,641 | Krueger | Nov. 14, 1944 |
| 2,305,592 | Anderson | Dec. 22, 1942 |
| 2,251,942 | Kimball | Aug. 12, 1941 |